G. HUILLIER.
WIND SHIELD FOR AUTOMOBILES.
APPLICATION FILED NOV. 2, 1908.

954,101.

Patented Apr. 5, 1910.
2 SHEETS—SHEET 1.

Witnesses:

Inventor:
Georges Huillier,
by
Attys

G. HUILLIER.
WIND SHIELD FOR AUTOMOBILES.
APPLICATION FILED NOV. 2, 1908.

954,101.

Patented Apr. 5, 1910.
2 SHEETS—SHEET 2.

Witnesses:
L. C. Schuermann.

Inventor:
Georges Huillier,
by Jennie Goldsborough O'Neill
Attys.

UNITED STATES PATENT OFFICE.

GEORGES HUILLIER, OF PARIS, FRANCE.

WIND-SHIELD FOR AUTOMOBILES.

954,101.  Specification of Letters Patent.  Patented Apr. 5, 1910.

Application filed November 2, 1908. Serial No. 460,655.

*To all whom it may concern:*

Be it known that I, GEORGES HUILLIER, a citizen of the French Republic, residing at Paris, Department of the Seine, in France, have invented certain new and useful Improvements in Wind-Shields for Automobiles, of which the following is a specification.

This invention relates to wind shields for automobiles and the object of the invention is to provide a device of this character that is capable of various adjustments.

The device comprises uprights that support a glass pane which can be supported at different heights and so manipulated as to entirely close the front of the vehicle or to extend forward or rearward at different inclinations as called for by the conditions that exist at any particular time.

The shield may be so adjusted as to form a screen or it may act merely as a deflector and if desired it may act as a wind deflector at the same time that it extends over and protects the steering wheel, as will appear more clearly hereinafter.

Figure 1:
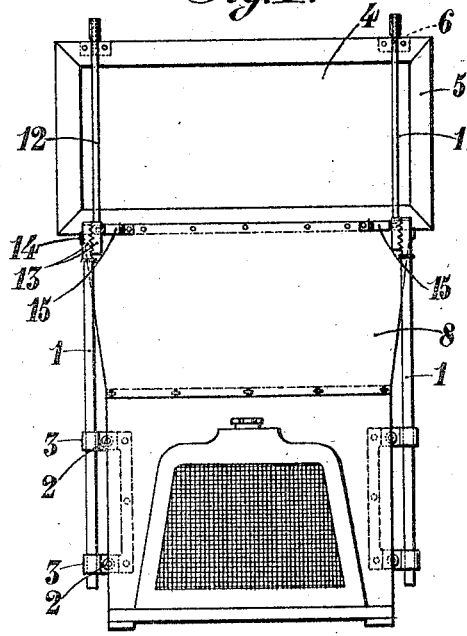
Figure 2:
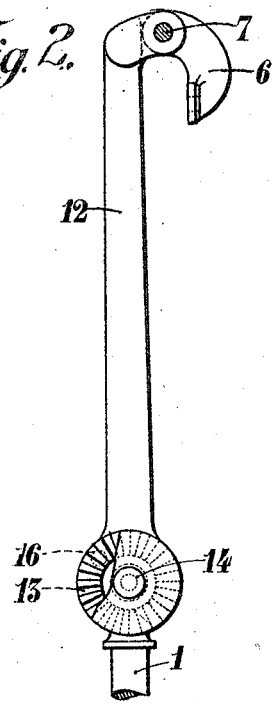

In the accompanying drawing, Figure 1 is a front view of a wind shield constructed in accordance with the invention and shown as applied to an automobile. Fig. 2 is a detail view of the adjusting mechanism, and Figs. 3 to 9 show the wind shield in a number of its adjusted positions.

The improved wind shield comprises in its construction two uprights 1 that are vertically adjustable at the sides of the vehicle in split collars 3, said uprights, which are formed by suitable rods, being clamped in the desired vertical position by means of screws 2 operating in the split collars. The upright rods are provided at their upper extremities with serrated disks 13 that are adjustably secured by means of set screws 14, to similar serrated disks 13 carried at the lower ends of bars 12 to the upper ends of which the frame 5 is secured. Said frame 5 surrounds a glass pane or screen 4 adapted to shield the driver of the automobile.

It will be noted from what has been said that the bars 12 are hinged or pivoted to the uprights 1 at the upper ends of the latter, whereby the bars 12 may be swung forward or rearward with respect to the uprights 1. The connection between the frame 5 and the bars 12 is effected by means of a link 6 pivoted to the upper extremities of the bars 12 by means of pivot pins 7, as shown in Fig. 2. The ends of the link 6 are preferably flattened and screwed to the frame 5. In this way the glass screen is freely suspended from the upper extremities of the bars 12 which extend transversely of the screen at the sides of the latter, as shown in Fig. 1. The lower edge of the screen or pane is connected by means of a suitable apron 8 with the top of the dashboard, and said apron is of such a length that when taut it will permit the uprights to be raised as high as desired.

In order to place the lower extremity of the screen in fixed relation with the uprights, sliding spring bolts 15 are placed on the lower edge of the frame 5, said bolts being adapted to engage the perforations 16 in the serrated disks 13 of the swinging bars 12.

Figure 3:
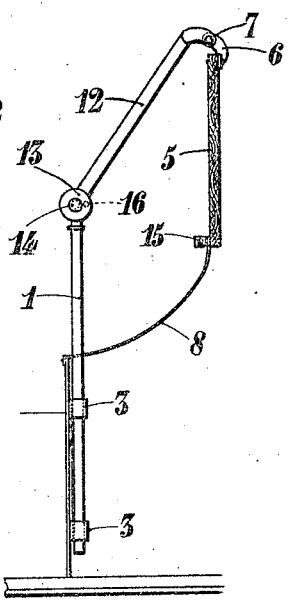

Fig. 3 shows the device as it appears when used as a wind screen. In this position, the screen 5 is freely suspended from the hinged bars and hangs vertically, the apron 8 assuming the position shown.

Figure 4:
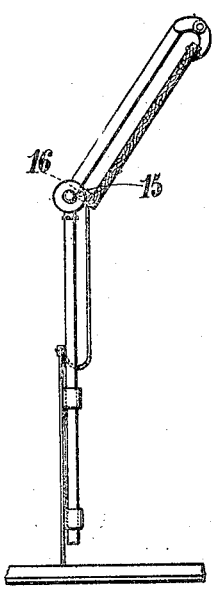

Fig. 4 shows the device when used as a deflector. In this case, the bolts 15 are engaged in the perforations 16, in order to firmly lock the lower edge of the glass frame 5 to the uprights.

Figure 7:
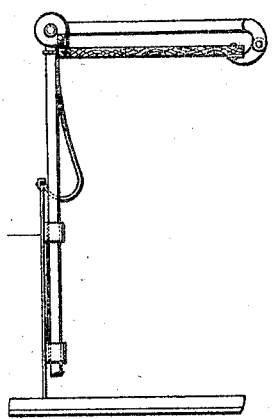
Figure 5:
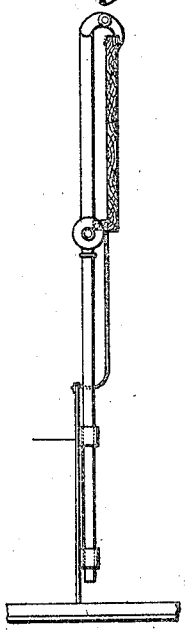
Figure 6:
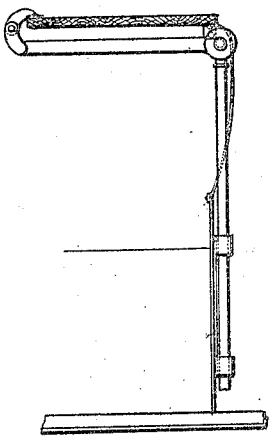

In Fig. 5 the screen and the bars 12 are shown as placed in a vertical position and in Figs. 6 and 7 the screen is placed horizontally, it being swung forward and rearward respectively from the uprights.

Figure 8:
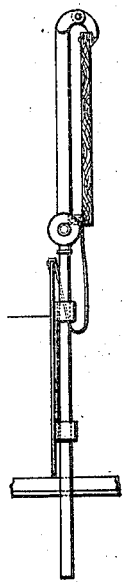
Figure 9:
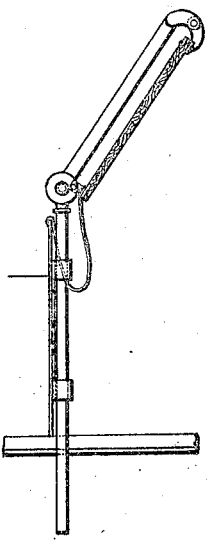

Figs. 8 and 9 show the device in different positions with the uprights 1 lowered to a certain extent.

The position in which the screen projects over the hood is found desirable in some cases, and when the screen projects rearwardly it affords perfectly clear vision while protecting the steering wheel.

The position shown in Fig. 8 is termed the "half-glass" position and permits a clear vision above the screen.

The position shown in Fig. 9 causes the wind to be deflected while at the same time the driver's view is not obstructed and he is protected very effectually against the resistance of the air.

What I claim is:—

1. In a wind shield for automobiles, the combination of uprights at the sides of the vehicle, bars hinged to the uprights, a screen freely suspended at its upper edge from the upper ends of the bars, and means to secure the lower edge of the screen to said bars.

2. In a wind shield for automobiles, the combination of uprights at the sides of the vehicle, bars hinged to the uprights and movable forward and rearward of the latter, a screen freely suspended at one edge from the free ends of the bars, and means to detachably lock the screen to the bars at the opposite edge of the former.

3. In a wind shield for automobiles, the combination of supporting uprights, bars hinged to the upper ends of the uprights and movable forward and rearward of the latter, a screen pivoted at its upper edge to the upper ends of the bars, and detachable means to secure the lower edge of the screen in fixed relation with said bars, whereby the inclination of the screen is determined by that of the bars.

4. In a wind shield for automobiles, the combination of supporting uprights, bars hinged to the uprights, a screen freely suspended at its upper edge from the upper ends of the bars, and locking devices to secure the lower edge of the screen to the bars at a point adjacent the hinged connection of the latter with the uprights.

5. In a wind shield for automobiles, uprights at the sides of the vehicle, bars hinged to the uprights, a screen freely suspended at its upper edge from the upper ends of the bars, an apron connecting the lower edge of the screen with the dash board, and means to secure the lower edge of the screen to said bars.

6. In a wind shield for automobiles, the combination of uprights at the sides of the vehicle and carrying at their upper ends serrated disks, a screen, bars having serrated disks adjustably clamped to those of the uprights and connected at their upper ends with the screen, and sliding bolts on the lower edge of the screen arranged to engage perforations in the serrated disks of said bars.

In testimony whereof I have hereunto set my hand in presence of two subscribing witnesses.

GEORGES HUILLIER.

Witnesses:
H. C. C... E,
EMILE K... OTZ.